(12) United States Patent
Reid

(10) Patent No.: US 7,258,241 B2
(45) Date of Patent: Aug. 21, 2007

(54) METHOD AND APPARATUS FOR FACILITATING BAR-CODE SCANNING OF RACK CONTENTS USING RACK COLUMN MOUNTED DISPLAY

(75) Inventor: Kenneth Shay Reid, Helena, AL (US)

(73) Assignee: Amerisourcebergen Drug Corporation, Chesterbrook, PA (US)

( * ) Notice: Subject to any disclaimer, the term of this patent is extended or adjusted under 35 U.S.C. 154(b) by 209 days.

(21) Appl. No.: 11/095,756

(22) Filed: Mar. 31, 2005

(65) Prior Publication Data
US 2006/0226099 A1 Oct. 12, 2006

(51) Int. Cl.
*A47F 5/08* (2006.01)

(52) U.S. Cl. .................. 211/113; 211/183; 211/103

(58) Field of Classification Search ............ 40/607.01, 40/607.02, 607.11, 618, 620, 622; 211/183, 211/191, 113, 189, 119.003, DIG. 1, 103, 211/106.01, 190, 207
See application file for complete search history.

(56) References Cited

U.S. PATENT DOCUMENTS

| | | | |
|---|---|---|---|
| 1,736,123 A | 11/1929 | McIntyre | |
| 3,889,408 A | 6/1975 | Offner | |
| 4,326,692 A | 4/1982 | Loomer | |
| 4,334,374 A * | 6/1982 | Spamer et al. ........... | 40/607.02 |
| 4,625,441 A | 12/1986 | Fast | |
| 4,688,341 A | 8/1987 | Castel | |
| 4,783,921 A * | 11/1988 | George ........................ | 40/602 |
| 5,120,941 A | 6/1992 | Reilley et al. | |
| 5,234,113 A | 8/1993 | Ramey | |
| 5,368,174 A | 11/1994 | Clark et al. | |
| 5,492,231 A | 2/1996 | Clark | |
| 5,526,945 A | 6/1996 | Clark et al. | |
| 5,655,675 A | 8/1997 | Clark et al. | |
| 5,749,482 A | 5/1998 | Clark | |
| 5,769,249 A | 6/1998 | Lascara | |
| 6,003,697 A | 12/1999 | Ferchat et al. | |
| 6,378,711 B1 | 4/2002 | Skulnik et al. | |
| 6,581,312 B2 | 6/2003 | Padiak et al. | |
| 2001/0047975 A1 | 12/2001 | Lazas et al. | |
| 2004/0149671 A1 | 8/2004 | Krueger et al. | |

* cited by examiner

*Primary Examiner*—Jennifer E. Novosad
(74) *Attorney, Agent, or Firm*—Howson & Howson LLP

(57) ABSTRACT

A display holder provides product information to loaders and pickers of products stored on industrial-sized pallet racks in warehouses. The display holder is disposed on a column in a substantially vertical orientation at a height above the floor of the warehouse that is approximately at or near eye level of an operator seated within a fork-lift or like material handling vehicle. The holder displays product information for all goods stored at the various rack elevations adjacent the column of the rack to which the display holder is mounted. Thus, warehouse loaders and pickers can readily determine the particular type of goods stored on the rack adjacent the display holder, and labels can readily be re-applied, as needed.

16 Claims, 4 Drawing Sheets

METHOD AND APPARATUS FOR FACILITATING BAR-CODE SCANNING OF RACK CONTENTS USING RACK COLUMN MOUNTED DISPLAY

BACKGROUND OF THE INVENTION

The present invention relates to a system for bulk warehousing and inventorying of products, and more particularly, the present invention relates to an apparatus and method for displaying information identifying the specific type and location of products stored on a storage, or pallet, rack so that products can be accurately loaded onto, and/or removed from, the rack.

Typically, numerous rows of vertically-extending pallet racks are arranged within a warehouse with aisles running adjacent the open front of each rack to afford access by fork-lift trucks or like material handling vehicles to the multi-tiered storage bays of the racks. Each pallet rack generally includes a plurality of horizontally-spaced vertical columns that support beams spanning lengthwise between the columns. The beams support shelves on which cartons of products are stored. Typically, the vertical tiers of storage bays extend well above the floor of the warehouse.

It is conventional practice to place labels, or label holders, on or adjacent beams directly above, or below, each shelf location to identify the specific product stored at that location on the rack. An example of such an arrangement and a holder for a label is disclosed in U.S. Pat. No. 4,625,441 issued to Fast. Other examples of pallet rack labeling systems are disclosed by U.S. Pat. Nos. 5,655,675, 5,526,945, 5,492,231, 5,368,174 and 5,749,482 issued to Clark et al.; U.S. Pat. No. 6,378,711 B1 issued to Skulnik et al.; U.S. Pat. No. 5,769,249 issued to Lascara; U.S. Pat. No. 5,120,941 issued to Reilley et al.; and U.S. Pat. No. 6,003,697 issued to Ferchat et al.

As discussed in the above referenced Clark patents, the labels typically include machine readable indicia such as bar-codes, human-readable indicia such as alpha-numeric characters, or preferably both. An electronic bar-code reading wand can be used for reading the labels and for inventory management purposes. However, reading labels located directly above or below products on shelves can be difficult for an operator of a fork lift truck or like vehicle, particularly if the labels are located at high or low elevations relative to the operator. A bar-code reader functions properly only if the face of the label is perpendicular relative to the line of sight of the bar-code reader so that the beam emitted by the reader is reflected from the label along the line of sight back to the reader. In addition, the line of sight to the label must not be obscured by the protective roof of the fork-lift truck, the stored products, the adjacent shelves, as well as the light emitted by the overhead warehouse lighting.

Although the aforementioned pallet rack labeling and inventory management systems may function in a satisfactory manner for their intended purposes, there is a need for a system that enables the ready reading of labels, such as bar code labels, by operators of fork-lift trucks or like vehicles used in warehouses. All labels should be capable of being read by conventional hand-held bar-code scanners or the like regardless of the elevation of the location of the products in the rack. In addition, the function of applying and/or reapplying labels on pallet racks should be capable of being safely accomplished with minimal effort and time.

SUMMARY OF THE INVENTION

In the present invention, a warehouse having merchandise storage racks including a plurality of columns and a plurality of support beams spanning lengthwise between the columns to define a plurality of vertical tiers of storage bays extending alongside an aisle in front of each rack is provided with a display holder that enables efficient and accurate order picking and placing to be achieved. The display holder has at least one flange that carries machine readable indicia corresponding to products stored in the bays. The flange is disposed at a predetermined horizontal angle to at least one of the columns and extends lengthwise of the column for a predetermined distance. The display holder also includes means for fastening the display holder at a predetermined level relative to the aisle for enabling the machine readable indicia disposed thereon to be read manually by someone located in the aisle and holding a machine reader in confronting juxtaposition with the flange.

Preferably, the display holder includes a pair of indicia-receiving flanges that are angulated with respect to one another and that each extend vertically along at least one of the rack columns. A medial portion of each flange is preferably disposed at an elevation of between about waist to about shoulder height above the warehouse aisle floor, and the flanges extend vertically about one to three feet above and below the medial portion. In addition, preferably the machine readable indicia includes a plurality of uniform product code arrays, such as bar-code labels, closely arranged vertically on each of the flanges with each of the uniform product code arrays corresponding to one vertical level of the bays of the rack. Each uniform product code array on one of the flanges corresponds to the bays of the rack along one side of the column, and each uniform product code array on the other flange corresponds to bays of the rack along the other side of the column.

According to another aspect of the present invention, a method of picking and placing products in a warehouse is provided. Merchandise storage racks are located in the warehouse and include a plurality of columns and a plurality of support beams spanning lengthwise between the columns to define a plurality of vertical tiers of storage bays extending alongside an aisle in front of the rack. Display holders are disposed alongside selected ones of the columns, and each display includes a plurality of uniform product code arrays in close vertically-spaced arrangement with each of said uniform product code arrays having a designator corresponding to a vertical level of one of the bays. The display holders are mounted to the columns at a level above the aisle floor as to be capable of being read by a bar-code reader held manually by someone located in the aisle and for enabling the person to correlate visually a predetermined bay level with one of the designators on the display holder. The method includes scanning with the bar-code reader the uniform product code array corresponding to a selected one of the designators.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE INVENTION

Figure 1:
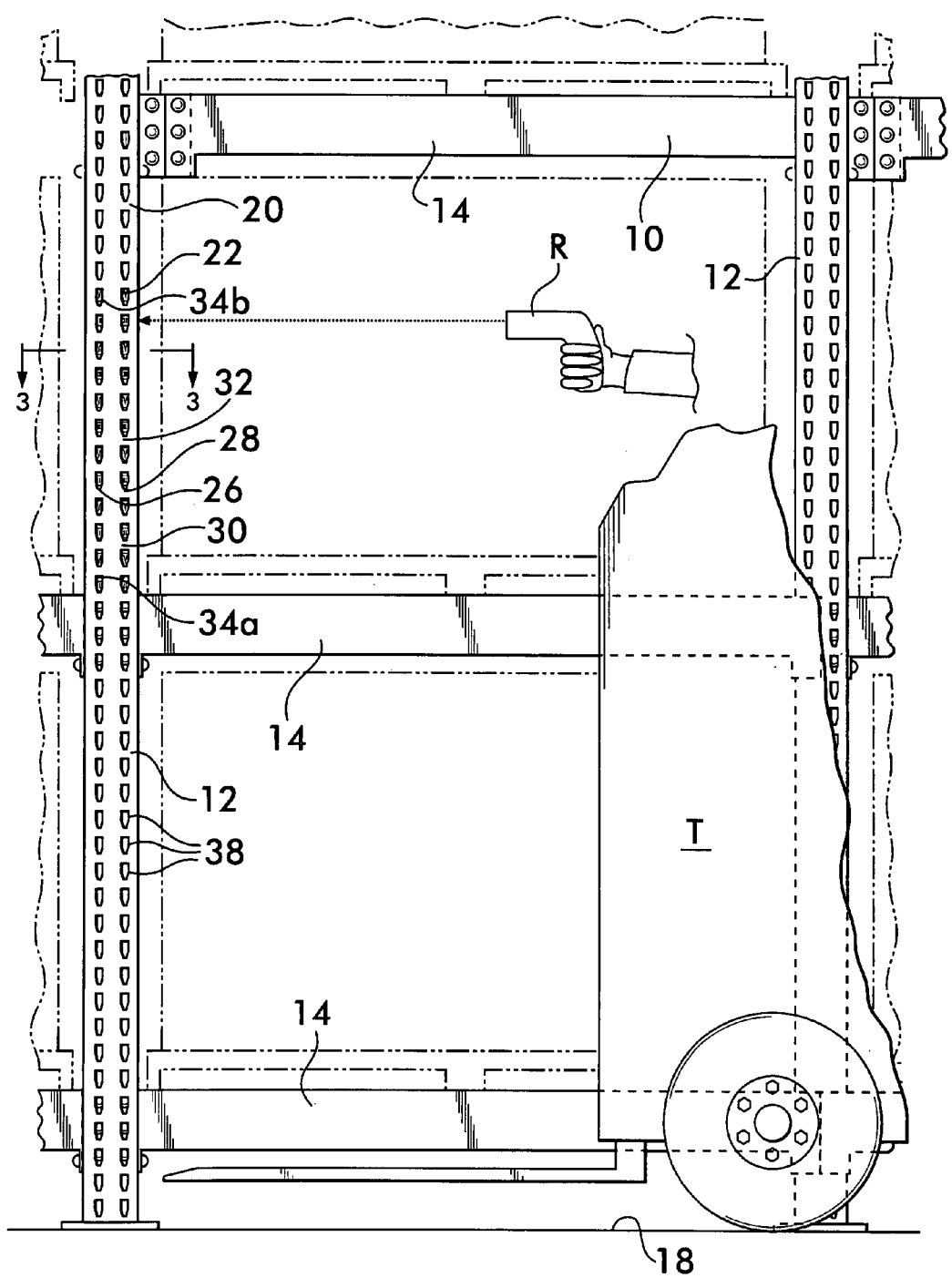
FIG. 1 is an elevation view of rack and display holder according to the present invention.

The present invention is directed to a labeling or inventory management system utilized in a warehouse in connection with the storage of bulk quantities of goods, products, merchandise, etc., that may be contained within cartons secured on pallets. The pallets of goods are stored on pallet, or storage, racks 10 each including a plurality of upright columns 12 and a plurality of beams 14 that span lengthwise between the columns 12 and that support shelves 16 for the goods. Each rack 10 extends vertically and has multiple tiers of shelves, or bays, 16 at various elevations above a ground level. For example, a pallet rack can have six vertically-spaced, horizontally-disposed bays 16 for the storage of goods. An aisle 18 extends along the open front 20 of the racks 10 to afford access to fork-lift trucks "T" and the like to load goods onto the shelves 16 and remove goods from the shelves 16. The labeling or inventory management system of the present invention can be utilized in connection with any pattern, shape, style, or size of rack, aisle, and/or warehouse configuration.

Warehouse personnel, sometimes known as loaders or placers, and unloaders or pickers, of goods must be able to readily determine the location of a particular pallet of goods within the warehouse. Inventories of different goods are typically distributed throughout the warehouse, and each different type of goods is stored at a predetermined location on one of the racks 10. Different types of goods may be located on different bays 16, or elevations, of the same rack and at different horizontally-spaced locations within the same bay 16. Thus, some means of labeling is required to inform warehouse personnel of the proper location for each item of goods in the warehouse.

According to the present invention, display holders 22 are utilized to provide product information to warehouse personnel for products stored on the racks 10. Each display holder 22 is of a relatively short length "L", for instance about one to about six feet, and is disposed in a substantially vertical orientation from a column 12 of the rack 10 at a height above the floor of the aisle 18 that is preferably at, or near, warehouse personnel eye level when standing in the aisle or seated on a fork-lift truck. The holder 22 displays product information for all goods stored at the various rack elevations adjacent the column 12 to which the display holder 22 is mounted. Thus, warehouse personnel can readily confirm the particular item of goods stored on the rack 10 by viewing and/or scanning labels displayed on the holder 22.

Figure 3:
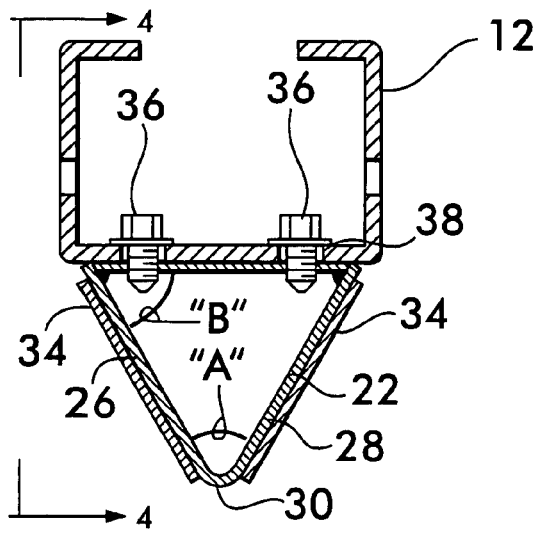
FIG. 3 is a cross-sectional view of the column and display holder along line 3-3 of FIG. 1.

According to one contemplated embodiment, the display holder 22 is provided as a relatively elongate, hollow conduit having a triangular transverse cross-section. For instance, see FIG. 3. The triangular cross-section is formed by a rear longitudinally-extending wall 24 and a pair of longitudinally-extending indicia-receiving walls, or flanges, 26 and 28. When mounted to a rack 10, the rear wall 24 of the display holder 22 confronts the front face 12a of the column 12 and the flanges, 26 and 28, extend forward of the front face 12a of the column 12 a spaced distance above the floor of the aisle 18. As best illustrated in FIG. 3, the flanges 26 and 28 are angulated relative to one another and are integrally connected forming a longitudinally-extending front edge 30 of the holder 22. An angle "A" formed adjacent the front edge 30 between flanges 26 and 28 is preferably about 60° to about 120°.

The display holder 22 is secured in an upright position to the column 12 such that the flanges, 26 and 28, extend vertically and such that each flange, 26 and 28, is disposed at a horizontal angle "B" relative to the lengthwise disposition of aisle 18. Preferably, angle "B" is within a range of about 30° to about 60°. In addition, preferably a medial portion 32 of the display holder 22 is located at an elevation above the floor of the aisle 18 corresponding to about waist or shoulder level of an average-sized worker standing adjacent the column 12. For instance, the medial portion 32 can be about five feet above the floor of the aisle 18. The above described positioning locates the product information displayed by holder 22 at a readily accessible location relative to someone located within the aisle 18 adjacent the display holder 22.

Figure 4:
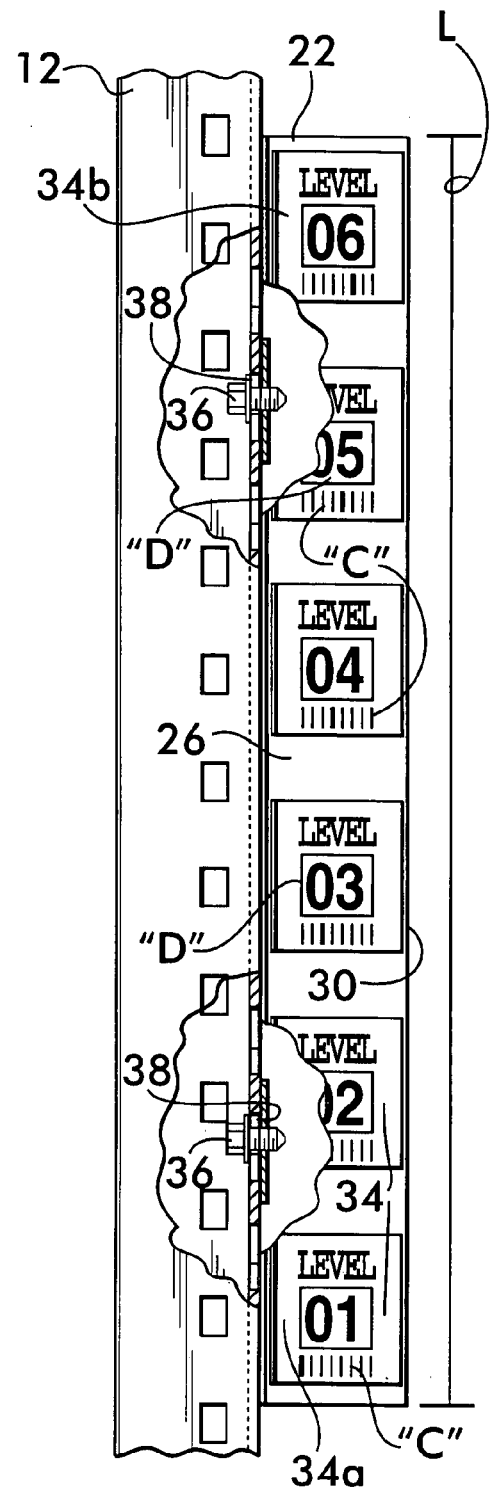
FIG. 4 is a partially cut-away cross-sectional view of the column and display holder along line 4-4 of FIG. 3.

Preferably, product information is provided in the form of labels, tags, or the like 34 attached, adhered, or printed directly to the flanges 26 and 28 of the holder 22. For example, each label 34 can contain a uniform product code array, bar-code, or like machine readable indicia "C" that identifies a particular product stored in the rack 10. Alphanumeric indicia can also be utilized to enable warehouse personnel to read the labels visually without the use of a bar-code scanner. In addition, preferably each label 34 includes a level designator "D" identifying the particular shelf adjacent the column 12 on which the corresponding product is located. For example, a product stored on the third shelf, or at a third elevation or level, could have a "3" as a level designator. See FIG. 4. Of course, other level designators "D" can be utilized, such as letters, roman numerals, etc.

Figure 2:
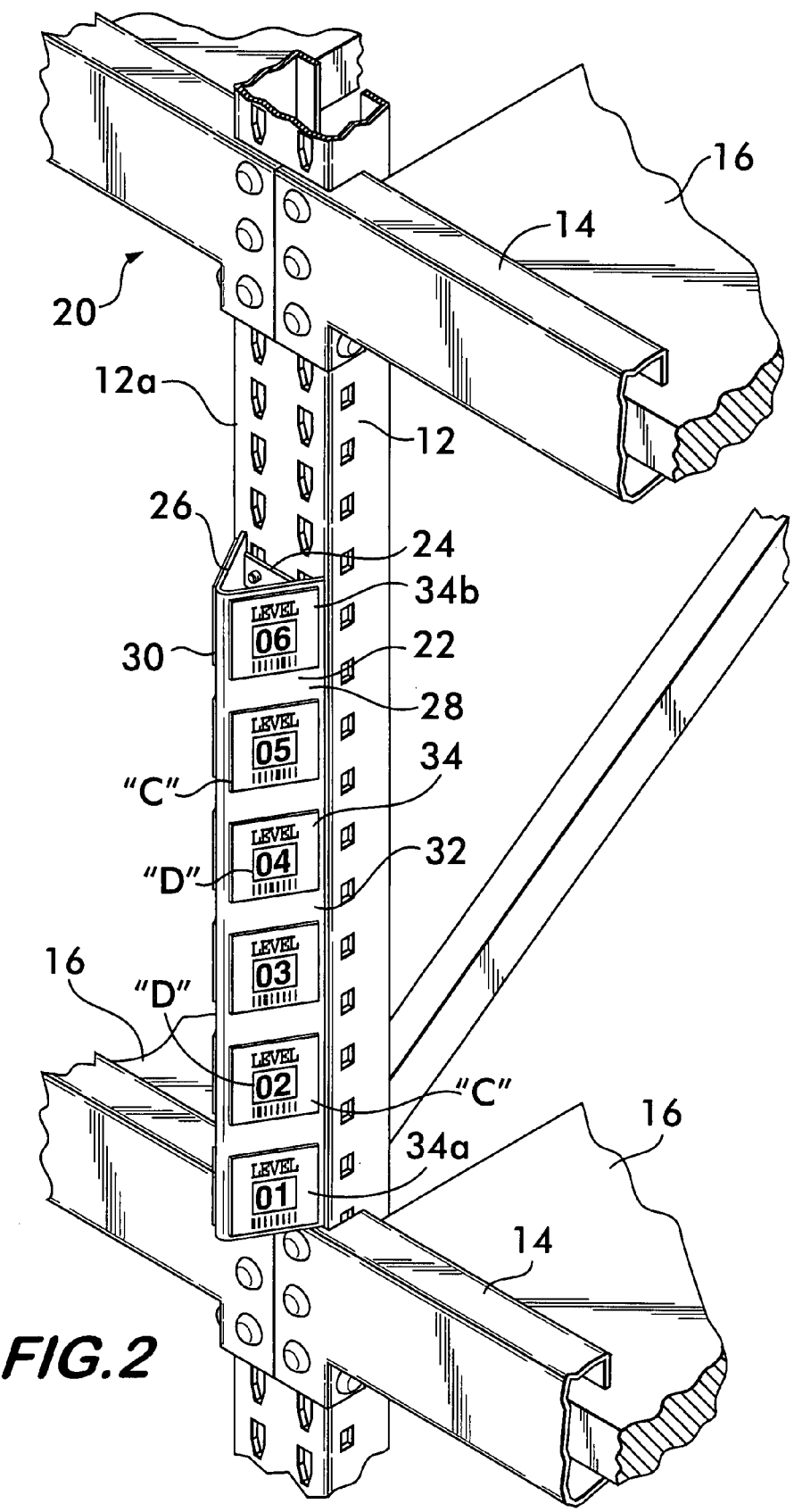
FIG. 2 is a perspective view of the display holder mounted to a rack column.

As best illustrated in FIGS. 2 and 3, the labels 34 are preferably positioned in close vertically-spaced arrangement on the holder 22 in an order corresponding to the arrangement of the products on the shelves of the rack. For instance, the lowest label 34a on flange, 26 or 28, would correspond to the product stored on the bottom shelf of the rack 10, and the uppermost label 34b on flange, 26 or 28, would correspond to the product stored on the top shelf of the rack. Thus, for a rack that has storage bays 16 at six different elevations, the flange, 26 or 28, would include six labels 36 as illustrated in FIGS. 1-3.

An arrangement of labels 34 is included on both flanges 26 and 28 of the display holder 22. The product information on flange 26 corresponds to the products located on the side of the column 12 adjacent flange 26 (e.g., to the left side of the column as shown in FIG. 1), and the product information on flange 28 corresponds to the products located on the side of the column 12 adjacent flange 28 (e.g., to the right side of the column as shown in FIG. 1).

An advantage provided by the use of display holder 22 is that product information is readily accessible to a fork-lift truck operator for all products located on the rack, including products located at the highest elevations of the rack. In addition, the labels are oriented in a human-friendly arrangement thereby eliminating any confusion with respect to the location of goods and corresponding labels. Bar-code readers "R" and like scanners can readily be pointed directly at the labels 34 in close proximately therewith. This eliminates problems with respect to the use of long-range scanners, obscured lines of sight, and to labels not being perpendicular to the line of sight of the bar-code reader. Further, when labels are required to be changed, a person standing on the aisle floor has easy access to the display holder, even for labels corresponding to products stored at the highest elevation of the rack.

Preferably, the display holder according to the present invention includes means for releasably fastening it to a column to afford retrofit installation, vertical adjustability of the display holder on the column, and easy removal of the holder for re-application of labels. Display holder 22 illustrated in FIGS. 3 and 4 has a rear wall 24 with rearwardly extending screws or bolts 36 for forming a mechanical connection between the holder 22 and column 12. As illustrated, the column 12 has a plurality of apertures 38 through which bolt or screw heads 36 extend to secure the holder 22 to the column 12. Display holder 40 illustrated in FIGS. 5 and 6 forms a similar mechanical connection with the column 12 with downwardly-directed hook elements 42 struck outwardly from the rear of the holder.

Figure 7:
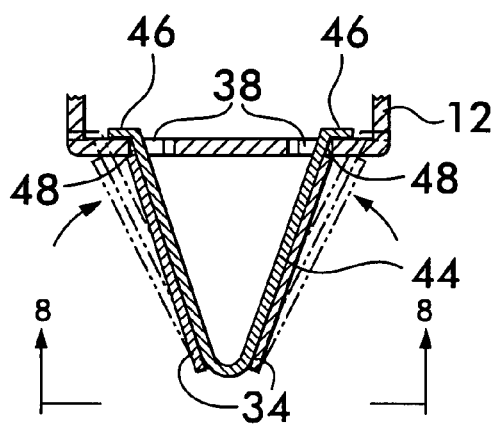
FIG. 7 is a cross-sectional view of a column and a third embodiment of a display holder according to the present invention.
Figure 8:
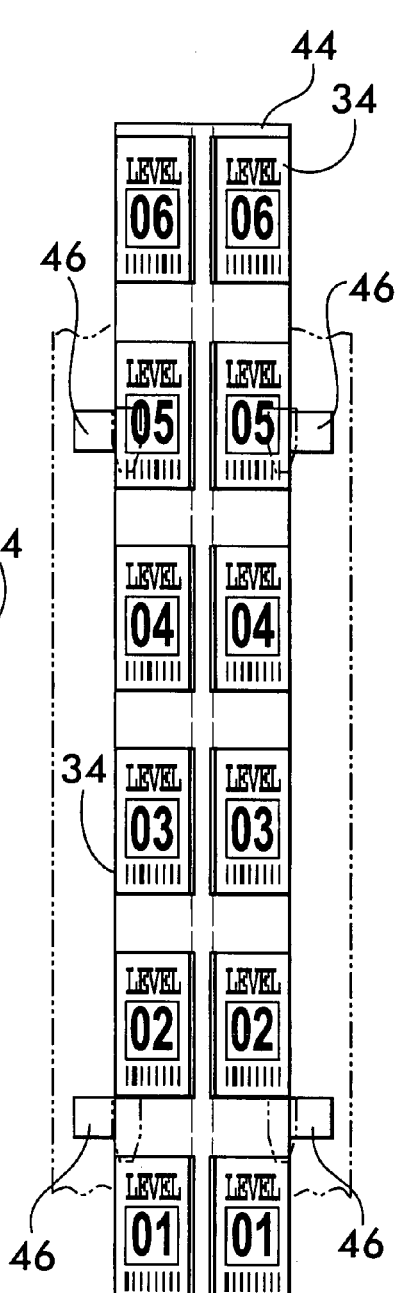
FIG. 8 is a cross-sectional view of the column and display holder along line 8-8 of FIG. 7.

In the display holder 44 illustrated in FIGS. 7 and 8, yet another mechanical type of connection is provided. To this end, the flanges are formed integral into a V-shaped cross section with laterally projecting tabs 46. The V-shaped body 44 enables the flanges to be pinched together to permit tabs 46 to be inserted through apertures 38 and then to resiliently expand to lock the holder 44 against to the edges 48 of the column 12 surrounding the apertures 38. The display holders 50 and 52 illustrated in FIGS. 9 and 10, respectively, utilize either an adhesive strip 54, or a magnet 56, to secure the holders to the column 12. Alternatively, straps, hook and loop fasteners, and the like can be utilized to secure holders to columns.

Figure 5:
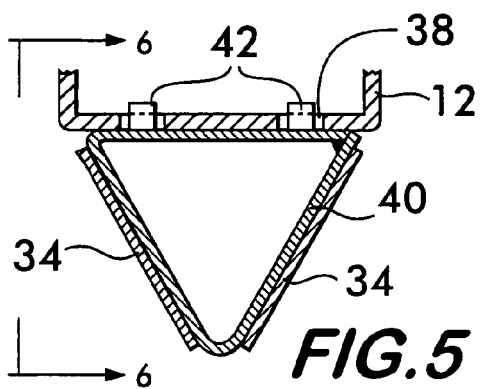
FIG. 5 is a cross-sectional view of a column and a second embodiment of a display holder according to the present invention.
Figure 6:
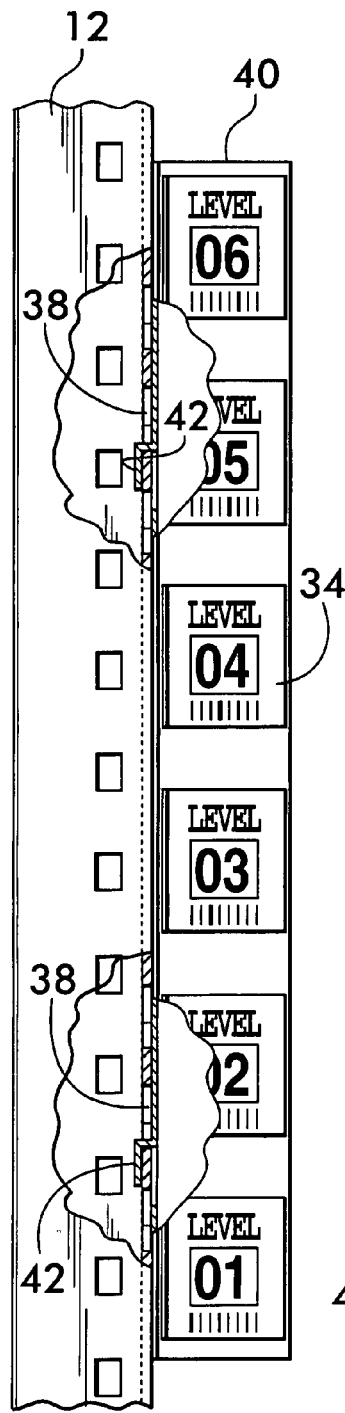
FIG. 6 is a partially cut-away cross-sectional view of the column and display holder along line 6-6 of FIG. 5.
Figure 9:
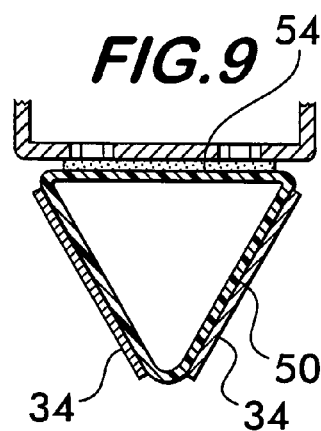
FIG. 9 is a cross-sectional view of a column and a fourth embodiment of a display holder according to the present invention.
Figure 10:
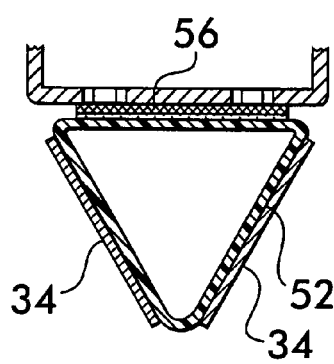
FIG. 10 is a cross-sectional view of a column and a fifth embodiment of a display holder according to the present invention.

The display holders can be made of metal, sheet metal, plastic, wood, cardboard, foam or like materials. For example, the display holder 22 is made of metal with the rear wall 24 being welded to both flanges, 26 and 28, (see FIG. 3). Alternatively, the display holder 40 shown in FIG. 5 is made of sheet metal requiring only one edge to be welded. Yet another alternative illustrated in FIGS. 9 and 10 is to make the holder, 50 and 52, from a hollow extruded and/or blow-molded tube of thermoplastic. The display holders can also have a solid construction such as by being formed of solid foam, plastic, wood or like material. If double-sided signs are not required, one of the flanges, 26 or 28, can be eliminated. In addition, depending on how the holder is secured to the column, the rear wall 24 of the holder can also be eliminated, such as illustrated in FIG. 7. Further, if the column has an arcuate or multi-sided front face, the rear wall of the holder can be made to conform to the shape of the front face of the column.

The method of the present invention provides improvements with respect to the efficiency of placing products for storage on racks and picking products stored on the racks within a warehouse. The method includes disposing display holders 22 alongside selected columns 12 of the racks 10. Each holder 22 displays a plurality of uniform product code arrays, bar codes, or like machine readable indicia "C" in close vertically-spaced arrangement on the holder 22. Preferably, each of the bar code labels 34 includes a rack level designator "D" corresponding to the vertical level of the bay 16 in which the corresponding product is stored. For example, if the rack has six levels of bays (ie., six elevations where products are located), a holder 22 would include six bar code labels vertically arranged on the holder with level designators "D" of 1 through 6. Thus, information for products at all elevations on the rack adjacent the column 12 is included on the display holder 22.

The holder 22 itself, may be of a length "L" of only about one to six feet, preferably about two feet. The method includes the step of mounting the display holder 22 to a column 12 at a level above the aisle floor which enables the indicia "C" to be easily read by a bar-code reader "R" held by someone located in the aisle 18. The level of the holder 22 should enable the person to correlate visually a predetermined bay level with one of the designators "D" on the display holder 22. When mounted to a column 12, a medial portion 32 of the holder 22 may be approximately five feet above the aisle floor and/or located at about eye level for a fork-lift operator. Of course the height at which the holder 22 is mounted above ground level can be adjusted depending on the needs of the users, the size of the material handling vehicles, etc.

The person in the aisle points the bar-code reader "R" at the selected bar-code label on the display holder 22 that corresponds to a selected one of the level designators "D" and scans the label. This provides the person with information concerning the product stored adjacent the column 12 on the shelf 16 at the selected level or elevation of the rack 10. Since all labels 34 are located at substantially eye level of warehouse personnel and since preferably the holder 22 displays the labels 34 at an angle "B" relative to the lengthwise direction of the aisle 18, the person located in the aisle 18 just in front of the display holder 22 can readily scan and read all labels, as desired. In addition, preferably the display holder 22 includes a pair of indicia receiving flanges, 26 and 28, so that products located on opposite sides of the column 12 can be readily distinguished according to the location of the bar-code label 34 on the respective flange, 26 or 28.

Preferably, the bar-code labels 34 can be applied or re-applied to the display holder 22 in an efficient and safe manner. For instance, labels 34 can be applied to the holder 22 when the holder is mounted to a column 12, or alternatively, the holder 22 can be removed from the column 12, re-applied with labels 34, and thereafter re-mounted on the column 12. The above steps are easily accomplished since the display holder 22 is mounted only a few feet from the ground surface. Thus, even if a new label is required for a product that is located at a high elevation, the label 34 can be readily applied to the display holder 22.

While a preferred system, apparatus and method have been described in detail, various modifications, alterations, and changes may be made without departing from the spirit and scope of the system, apparatus and method according to the present invention as defined in the appended claims.

The invention claimed is:

1. A merchandise storage system for a warehouse, comprising:

a storage rack having a plurality of columns and a plurality of support beams spanning lengthwise between the columns to define a plurality of vertical tiers of storage bays extending alongside an aisle in front of the rack, a display holder carrying machine readable indicia corresponding to said bays, said display holder including a pair of indicia-receiving flanges angulated relative to one another and each disposed at a predetermined horizontal angle to at least one of said rack columns, said flanges having a medial portion disposed on said one rack column at an elevation of about waist to about eye level above said aisle and extending lengthwise of said one rack column for a predetermined distance, said machine readable indicia including a plurality of bar-code labels arranged vertically on each of said pair of flanges with each bar-code label corresponding to one vertical level of said bays and with the bar-code labels on one flange corresponding to the bays along one side of said column and the bar-code labels on the other flange corresponding to bays along the other side of said column, and means for fastening said display holder to said one rack column such that said flanges are at a predetermined level relative to said aisle enabling said indicia disposed thereon to be read manually by warehouse personnel located in said aisle and holding a machine reader in confronting juxtaposition with one of said display holder flanges.

2. System according to claim 1, wherein said flanges extend vertically above and below said medial portion for at least one foot.

3. System according to claim 1, wherein said holder flanges are disposed at a horizontal angle in a range of about 30° to about 60° relative to the lengthwise disposition of said aisle.

4. System according to claim 1, wherein said pair of said flanges are angulated relative to one another to subtend an included angle in a range of about 60° to about 120°.

5. System according to claim 1 wherein said pair of holder flanges are integral with one another adjacent said included angle, and said means for fastening includes a strap connecting said flanges together opposite said included angle for disposition against said column and connection thereto.

6. System according to claim 1, wherein said means for fastening includes complementary means on the column and the holder for releasably connecting the holder to the column to afford retrofit installation and vertical adjustability of said display holder.

7. System according to claim 6, wherein said complementary means includes a mechanical connection.

8. System according to claim 6, wherein said complementary means includes an adhesive fastener.

9. System according to claim 6, wherein said complementary means includes a magnetic fastener.

10. System according to claim 6, wherein said complementary means includes a tab formed integral with said flange for engaging an edge formed in said column.

11. System according to claim 1, wherein each of said plurality of bar-code labels has a designator corresponding to a vertical level of one of said bays.

12. A merchandise storage system for a warehouse, comprising:

a storage rack having a plurality of columns and a plurality of support beams spanning lengthwise between the columns to define a plurality of vertical tiers of storage bays extending alongside an aisle in front of the rack, a display holder carrying machine readable indicia corresponding to said bays, said display holder including a pair of indicia-receiving flanges angulated with respect to one another and extending vertically along at least one of said rack columns, said flanges being disposed on said one rack column at a predetermined level relative to said aisle to enable indicia disposed thereon to be read manually by an order picker located in said aisle and holding a machine reader in confronting juxtaposition with said display holder flange, said machine readable indicia including a plurality of uniform product code arrays arranged vertically on each of said flanges with each of said arrays corresponding to one vertical level of said bays and with the arrays on one flange corresponding to the bays along one side of said column and the arrays on the other flange corresponding to bays along the other side of said column, whereby warehouse personnel can readily visually relate each indicia of said arrays with a predetermined bay location to facilitate machine reading thereof.

13. System according to claim 12, wherein a medial portion of said flanges are disposed at an elevation of about waist to about eye level height above said warehouse aisle, and said flanges extend vertically less than three feet above and below said medial portion.

14. System according to claim 13, wherein said flanges are angulated relative to one another to subtend an included angle in a range of about 60° to about 120°, and wherein each of said flanges is disposed at a horizontal angle in a range of about 30° to about 60° relative to the lengthwise disposition of said aisle.

15. System according to claim 14, further comprising complementary means on the column and said display holder for releasably connecting the display holder to the column to afford retrofit installation and vertical adjustability of said display holder.

16. System according to claim 15, wherein said display holder is elongate, hollow and has a substantially triangular transverse cross-section.

* * * * *